L. W. WITRY.
INTERNAL COMBUSTION ENGINE.
APPLICATION FILED DEC. 30, 1916.
1,233,739.
Patented July 17, 1917.
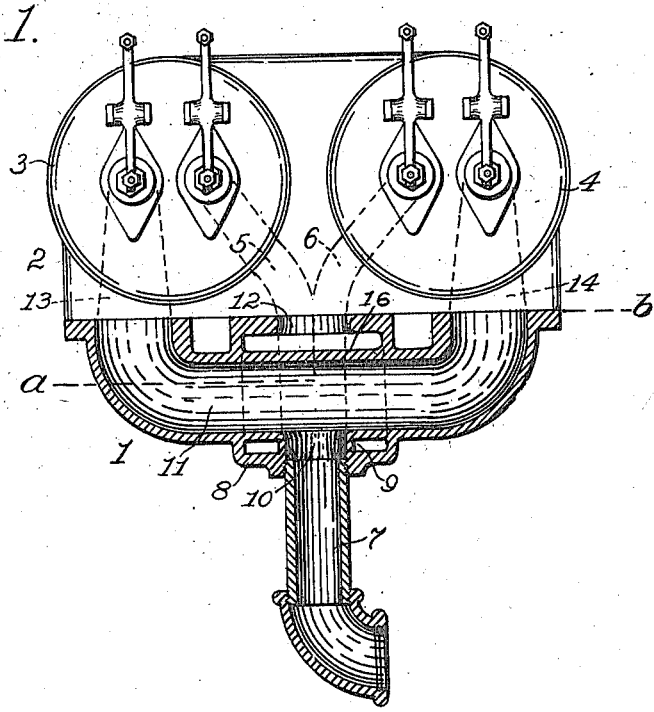
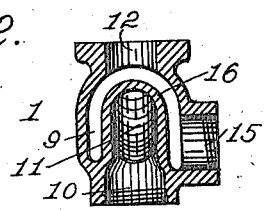
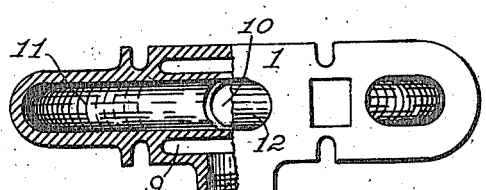
Inventor,
L. W. Witry, by
G. C. Kennedy,
Attorney.

UNITED STATES PATENT OFFICE.

LOUIS W. WITRY, OF WATERLOO, IOWA, ASSIGNOR TO WATERLOO GASOLINE ENGINE COMPANY, OF WATERLOO, IOWA.

INTERNAL-COMBUSTION ENGINE.

1,233,739.

Specification of Letters Patent. Patented July 17, 1917.

Application filed December 30, 1916. Serial No. 139,755.

*To all whom it may concern:*

Be it known that I, LOUIS W. WITRY, a citizen of the United States of America, and a resident of Waterloo, Blackhawk county, Iowa, have invented certain new and useful Improvements in Internal-Combustion Engines, of which the following is a specification.

My invention relates to improvements in internal combustion engines, and the object of my improvement is to supply a gasifier for vapors of heavy hydrocarbons adapted to be heated by conducted heat from the exhaust gases passing from the engine.

This object I have accomplished by the means which are hereinafter described and claimed, and which are illustrated in the accompanying drawings, in which:

Figure 1 is an end elevation of an internal combustion engine with my improved gasifier attached, the latter in longitudinal section.

Fig. 2 is a medial cross-section of said gasifier.

Fig. 3 is a plan view of the gasifier, with part broken away, along the line a—b of Fig. 1.

Similar numerals of reference denote corresponding parts throughout the several views.

The engine shown, has two cylinders 3 and 4, supplied with exhaust-ports 13 and 14, and with inlet-ports 5 and 6, respectively, the latter converging to form one channel in the cylinder-casing to communicate with the single port 12 of the gasifier 1, the latter being secured upon said casing by an appropriate means.

The gasifier 1 consists of a single casting, having an opening in communication with an exhaust-pipe 7. Said gasifier also has an opening 15 in communication with a carbureter (not shown). The gasifier contains a longitudinal passage 11 communicating at each end with the exhaust-ports 13 and 14 respectively, said passage communicating by means of an opening 10 with the exhaust-pipe 7. The port 15 effects communication between the carbureter and annular channels 9 passing around the middle of the inner tube 16 through which the channel 11 passes, said channels leading into the port 12 and the inlet-channels 5 and 6 of the engine. Vapors of a heavy hydrocarbon which pass from the carbureter through the port 15 and annular channels 9 to the port 12 around the heated tube 16 containing hot exhaust-gases, is split up into such fine particles as to be in a proper condition for combustion in the combustion-chamber of the engine.

The gasifier is very simple and cheap in construction, and effective in its action.

Having described my invention, what I claim as new, and desire to secure by Letters Patent, is:

A gasifier for an internal combustion engine, consisting of a single casting having a longitudinal passage communicating at opposite ends with the exhaust-ports of a two-cylinder engine, and having a medial delivery port for said passage, and also containing a channel in communication with a carbureter and arranged about the said passage and a branched exteriorly located manifold in communication between said channel and the inlet-ports of said engine.

Signed at Waterloo, Iowa, this 5th day of Aug., 1916.

LOUIS W. WITRY.